US012760771B1

(12) United States Patent
Stearns

(10) Patent No.: US 12,760,771 B1
(45) Date of Patent: Oct. 13, 2026

(54) MAGNETIC BRAKE ASSEMBLY FOR USE ON AN EXERCISE MACHINE

(71) Applicant: Kenneth W Stearns, Houston, TX (US)

(72) Inventor: Kenneth W Stearns, Houston, TX (US)

( * ) Notice: Subject to any disclaimer, the term of this patent is extended or adjusted under 35 U.S.C. 154(b) by 298 days.

(21) Appl. No.: 18/731,622

(22) Filed: Jun. 3, 2024

Related U.S. Application Data

(60) Provisional application No. 63/470,913, filed on Jun. 4, 2023.

(51) Int. Cl.

| | |
|---|---|
| ***F16D 63/00*** | (2006.01) |
| ***A63B 21/005*** | (2006.01) |
| ***F16D 65/28*** | (2006.01) |
| ***F16H 1/28*** | (2006.01) |
| *F16D 121/18* | (2012.01) |

(52) U.S. Cl.
CPC ........ *F16D 63/002* (2013.01); *A63B 21/0051* (2013.01); *F16D 65/28* (2013.01); *F16H 1/28* (2013.01); *F16D 2121/18* (2013.01)

(58) Field of Classification Search
CPC ...... A63B 21/0051; F16H 1/28; H02K 7/104; H02K 7/106; F16D 63/002; F16D 65/28; F16D 2121/18–20
See application file for complete search history.

(56) References Cited

U.S. PATENT DOCUMENTS

| | | | | |
|---|---|---|---|---|
| 4,567,963 A * | 2/1986 | Sugimoto | A62B 1/08 182/236 |
| 2002/0016236 A1* | 2/2002 | Stearns | A63B 21/157 482/57 |
| 2012/0055740 A1* | 3/2012 | Allington | H02K 49/04 182/231 |
| 2016/0001625 A1* | 1/2016 | Wolf | B60G 13/00 188/266.1 |
| 2020/0023232 A1* | 1/2020 | French | A63B 22/0076 |
| 2020/0304011 A1* | 9/2020 | Diehl | H02K 7/116 |

* cited by examiner

*Primary Examiner* — David R Morris
(74) *Attorney, Agent, or Firm* — Nick A Nichols, Jr.

(57) ABSTRACT

A magnetic brake assembly coupled to an exercise machine may include a cable spool, a ring gear, compound planet gears, a sun gear and a rotatable disk operable to convert rotational motion to linear motion. A magnet holder may position magnets relative to the disk to induce eddy currents in the disk to resist linear movement of movable members of the exercise machine.

10 Claims, 6 Drawing Sheets

MAGNETIC BRAKE ASSEMBLY FOR USE ON AN EXERCISE MACHINE

CROSS-REFERENCE TO RELATED APPLICATION

This application claims priority to and the benefit of the filing date of U.S. Provisional Application Ser. No. 63/470,913, filed Jun. 4, 2023, which application is herein incorporated by reference in its entirety.

BACKGROUND

The present invention relates to an improved magnetic brake for use on an exercise machine, particularly on a climbing or stepping exercise machine where foot and arm members reciprocate up and down as a user shifts their weight from one side to the other.

Eddy current resistance devices are known in the prior art. For example, linear, eddy-current brakes may be used on train tracks and rollercoasters, where the track itself or something mounted on it forms part of the brake. This type of linear brake includes a stationary component and another component which moves past the stationary component in a straight line. In a conventional train, magnets, such as electromagnets which may be switched on and off, may be built into the structure that carry the train's wheels. When activated, the magnets slow down the train by creating eddy currents inside the rail, i.e., the stationary component.

Similarly, circular brakes may include a static part and a moving part. A simple configuration may include stationary magnets that create eddy currents in a rotating brake disc. For example, exercise bicycles may use eddy-current brakes mounted on the bicycle frame to provide exercise resistance.

SUMMARY

A magnetic brake assembly coupled to an exercise machine may include a cable spool, a ring gear, compound planet gears, a sun gear and a rotatable disk operable to convert rotational motion to linear motion. A movable magnet holder may position magnets relative to the disk to induce eddy currents in the disk to resist movement of movable members of an exercise machine.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
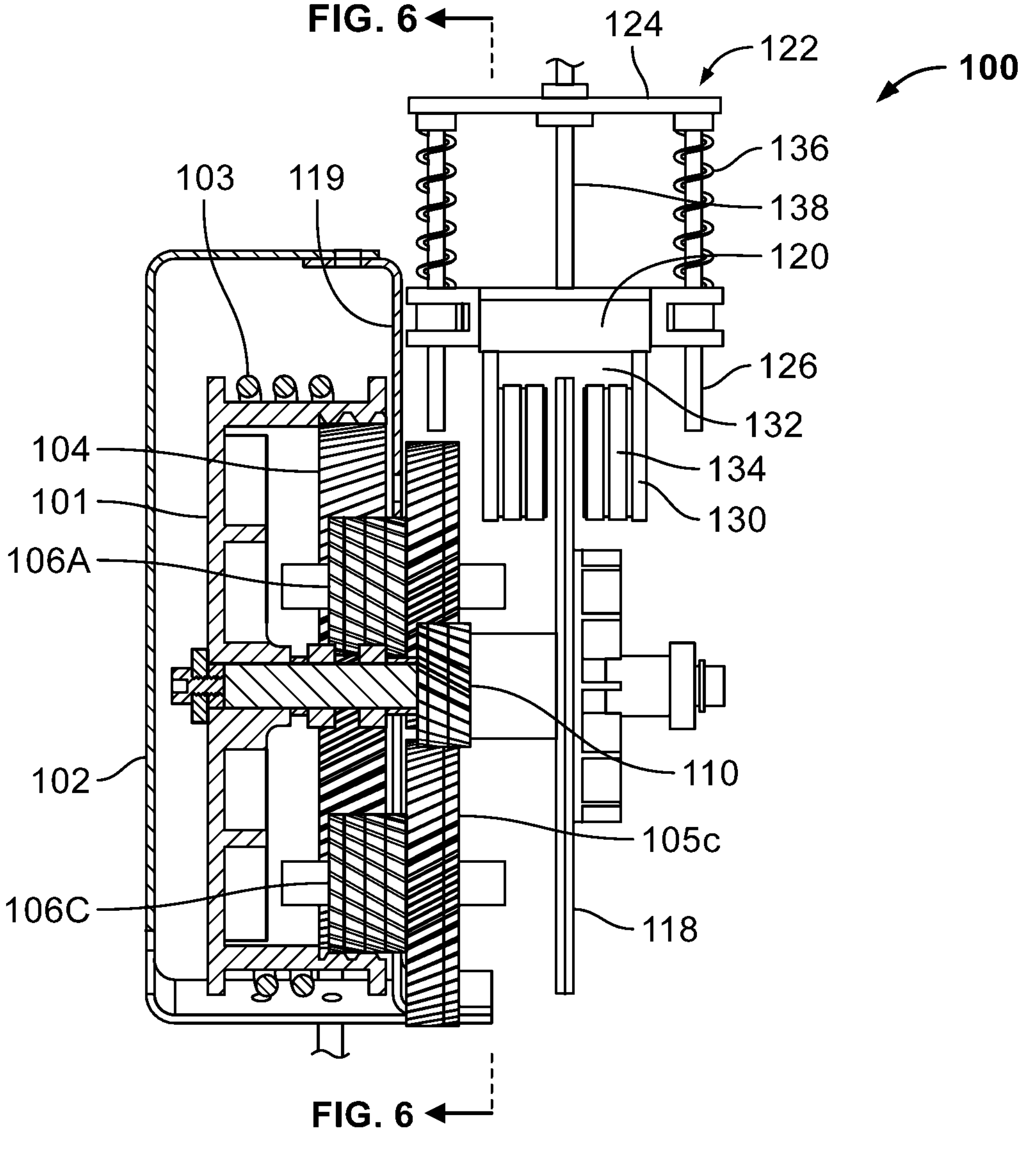
FIG. 1 is a section view of a magnetic brake assembly for an exercise machine with some structural elements removed.

Referring first to FIG. 1, a magnetic brake assembly 100 for an exercise machine may include a cable spool 101 rotatably connected to a mounting bracket 102 that may be fixedly secured to an exercise machine frame (not shown in the drawings). A cable 103 may be wrapped over the cable spool 101 one or more times. The opposite ends of the cable 103 may be attached to reciprocating members of the exercise machine. Cable spool 101 may include an internal ring gear 104. The ring gear 104 may be integral with the cable spool 101 or a separate component secured to the cable spool 101 by a flange connector or other suitable connector.

Figure 2:
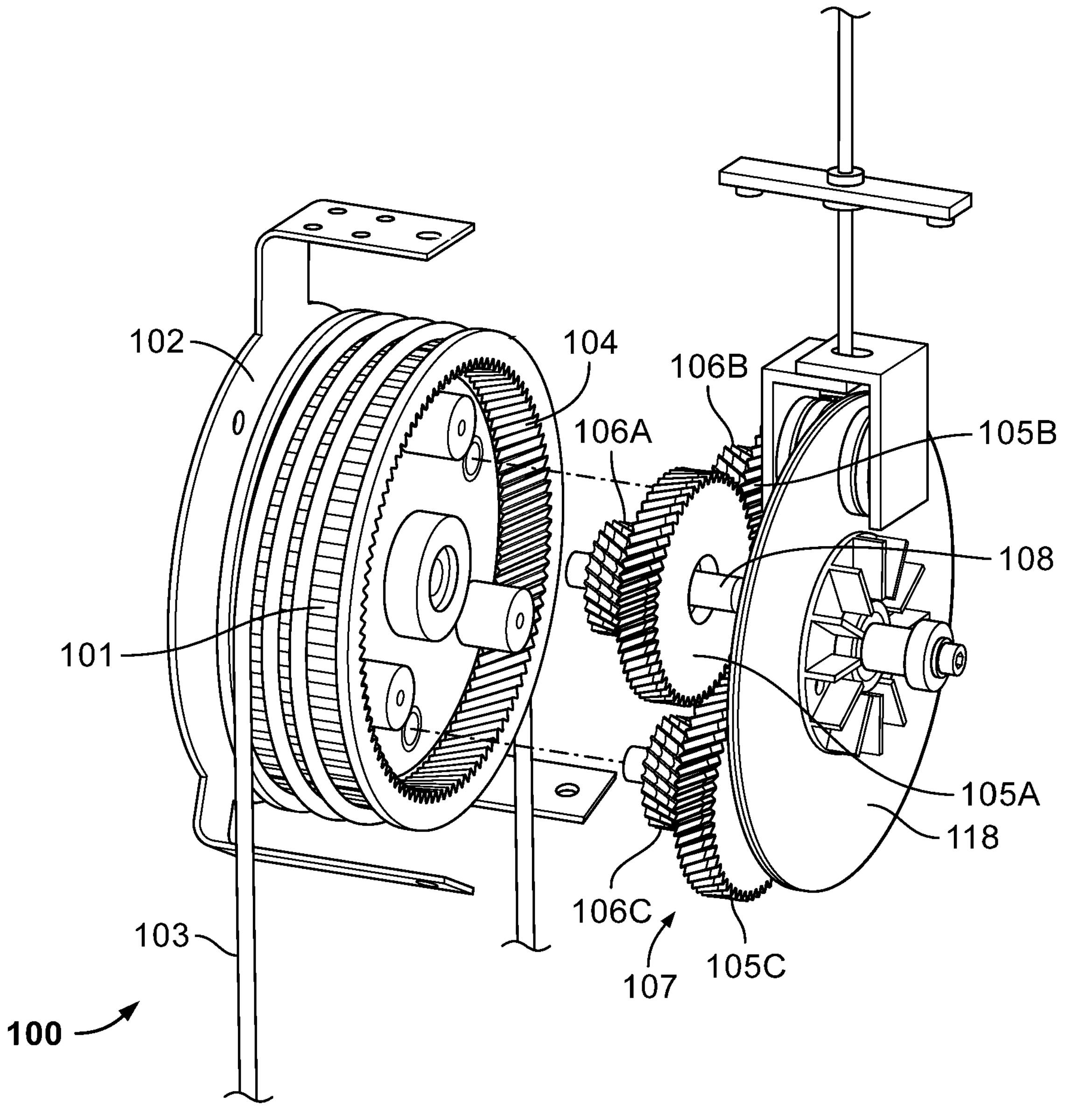
FIG. 2 is an exploded perspective view of the magnetic brake assembly shown in FIG. 1 with some components removed.

Referring now to FIG. 2, for illustrative purposes but not by way of limitation, the magnetic brake assembly 100 may include three compound planet gears 107 rotatably supported by planet gear shafts 108. Compound planet gears 107 comprise a pair of rigidly connected and longitudinally arranged planet gears of different diameters. Each compound planet gear 107 includes large diameter planet gears 105A, 105B and 105C connected inline to smaller diameter planet gears 106A, 106B and 106C, respectively. The larger diameter planet gears 105A, 105B, 105C mesh with a centrally located sun gear 110. The smaller diameter planet gears 106A, 106B and 106C mesh with ring gear 104.

Figure 3:
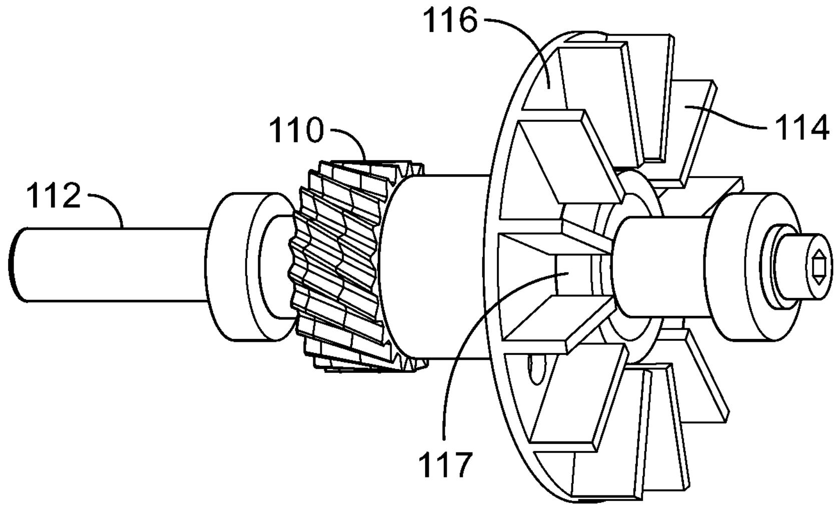
FIG. 3 is a perspective view of the sun gear component of the magnetic brake assembly shown in FIG. 1.
Figure 4:
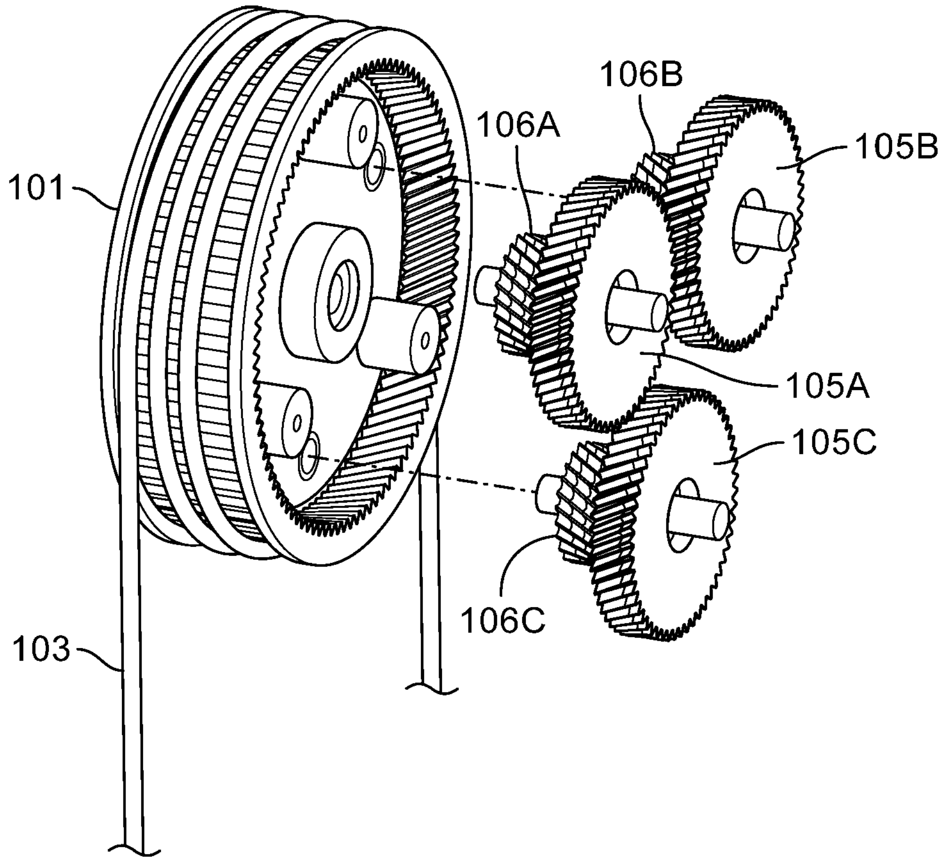
FIG. 4 is an exploded perspective view of the cable spool and planetary gears components of the magnetic brake assembly shown in FIG. 1.
Figure 5:
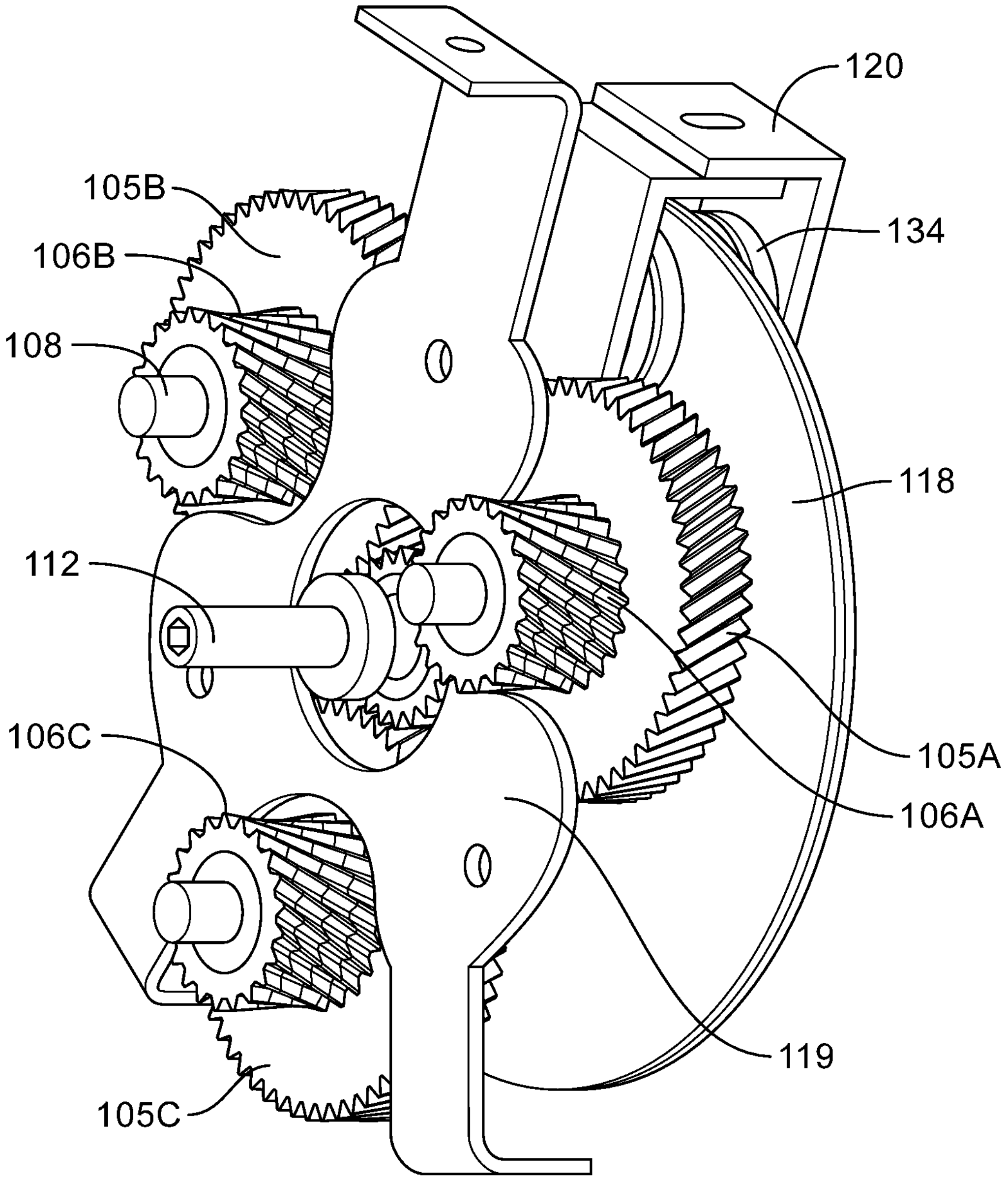
FIG. 5 is a perspective view of a partial assembly of components of the magnetic brake assembly shown in FIG. 1.
Figure 6:
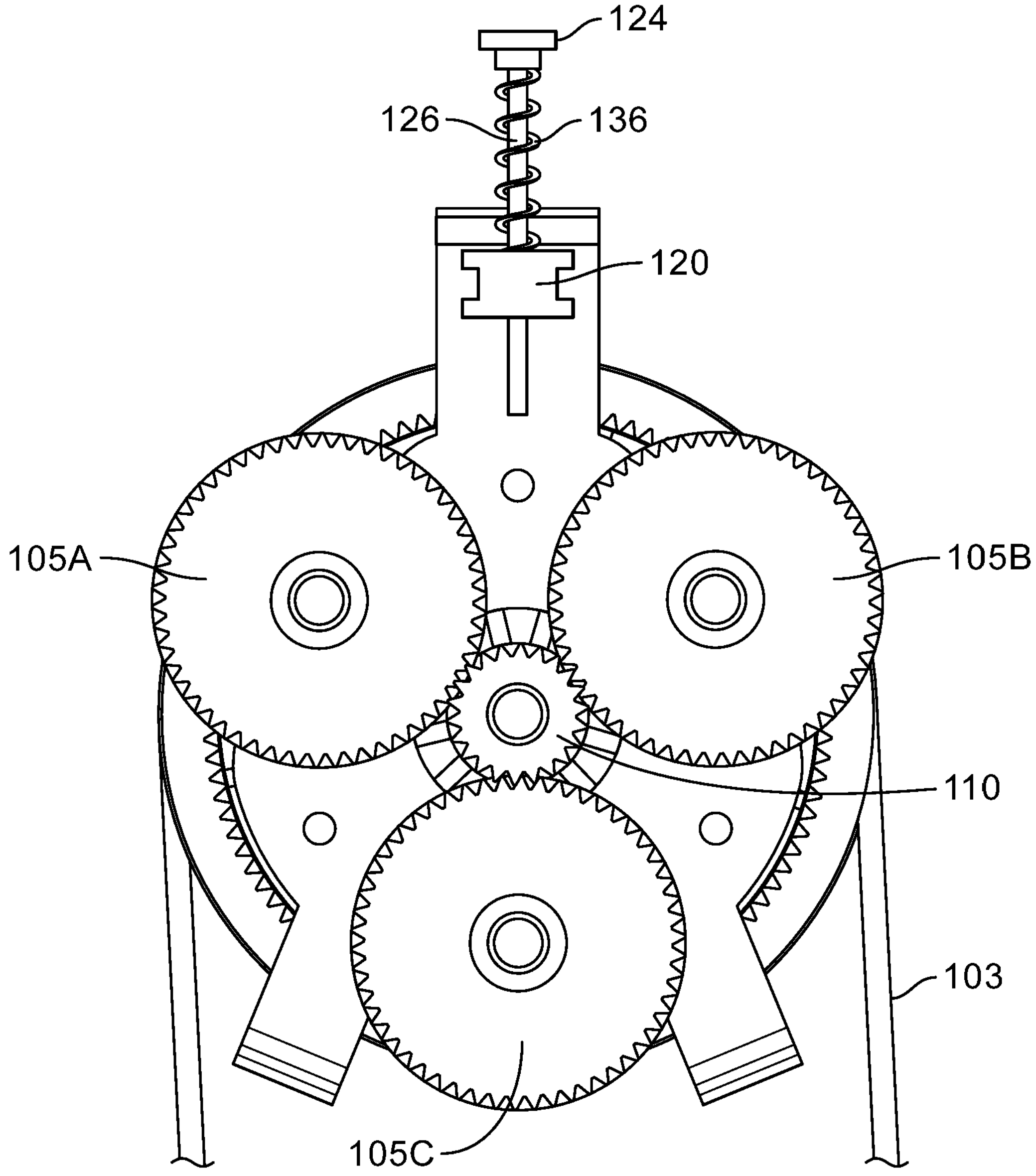
FIG. 6 is a section view taken along line 6-6 in FIG. 1 illustrating an arrangement of a planet gears of the magnetic brake assembly shown in FIG. 1.

Referring now to FIG. 3, the sun gear 110 may include a longitudinally extending shaft 112. A fan mounting plate 116 may be fixedly secured proximate to a distal end of the sun gear shaft 112. Shaft 112 may extend through a hub 117 defining an axial opening through the mounting plate 116. The mounting plate 116 may be oriented substantially perpendicular to the longitudinal axis of the sun gear shaft 112. A plurality of fan blades 114 secured to the mounting plate 116 may extend radially outward from the hub 117. Fan blades 114 may direct air radially outward onto the disk 118 to counter heat generated by barking forces regardless of the direction of spin of the disk 118.

Referring again to FIG. 1, disk 118 may be fixedly secured to the mounting plate 116. The sun gear shaft 112 may extend through a central hole in the disk 118 that is coaxial with the hub 117 of the mounting plate 116. The disk 118 may be fixed to the mounting plate 116 by means known in the art, including but not limited to, connector pins and the like. The disk 118 may be oriented transverse to the longitudinal axis of sun gear shaft 112. Disk 118 may be constructed from conductive materials, such as but not limited to, aluminum or copper. The planetary gears 107, sun gear 110 and disk 118 may be rotatably supported by a planet gear carrier 119 mounted to the mounting bracket 102.

A magnet support bracket 122 may be secured to a frame member of the exercise machine (not shown in the drawings). The magnet support bracket 122 may include a base member 124. Guide posts 126 may be fixedly secured proximate to opposite distal ends of the base member 124 and extend downward therefrom.

A generally U-shaped magnet holder 120 may be slidably coupled to the magnet support bracket 122. The magnet holder 120 may include sidewalls 130 that are spaced apart and define a gap 132 therebetween. The sidewalls 130 of the magnet holder 120 may hold magnets 134 in facing relationship spaced apart from one another. The magnet holder 120 may be constrained to linear movement along the guide posts 126 of the magnet support bracket 122. Springs 136 sleeved on the guide posts 126 may be disposed between the base 124 of the magnet support bracket 122 and the magnet holder 120. The springs 136 provide a downward biasing force against the magnet holder 120.

A cable 138 may connect the magnet holder 120 to a remote adjustment knob, lever or other means known in the art, including but not limited to, a stepper motor, to adjust the position of the magnets 134 relative to disk 118. Alternatively, an adjustment motor may be mounted directly on the support bracket 122 without use of cable 138, such as, but not limited to, a rack and pinion configuration.

The magnet holder 120 may be advanced or retracted to adjust the position of the magnets 134 relative to the disk 118. The magnets 134 are laterally spaced from and do not contact the surface of disk 118. As the magnet holder 120 is advanced downward to position the magnets 134 along opposite sides of the disk 118, the magnetic field strength generated by the magnets 134 increases, thereby increasing the braking force provided by the magnetic brake assembly 100. Rotation of the fan blades 114 direct air radially outward onto the disk 118 regardless of the direction of spin of the disk 118 to counter heat generated by the barking force.

The magnetic brake assembly 100 may include bearings at all the rotating joints. The teeth of the compound planet gears 107 and sun gear 110 may be, but are not limited to, spur gear type, helical and double helical teeth and other suitable gear configurations. Alternatively, but not limited to, the magnetic brake assembly 100 may utilize a chain, timing belt and the like instead of the cable 103 to drive the ring gear 104 and rotate the disk 118.

The magnetic brake assembly 100 takes advantage of eddy current brake forces generated between rotating disk 118 and the magnets 134 supported by the magnet holder 120 at various positions relative to disk 118. The magnets 134 generate eddy currents that oppose rotation of the disk 118 and thereby provides resistance to the linear reciprocal movement of movable members of the exercise machine attached to the cable 103. Eddy current resistance to rotation of the disk 118 is converted to resistance to the linear reciprocal motion of the foot support members of the exercise machine through the cable spool 101 and cable 103.

In an example implementation, the magnetic brake assembly 100 may be operatively connected to foot support members of a stepper exercise machine. The distal ends of cable 103 may be connected to respective foot support members movably supported on the stepper exercise machine for synchronized reciprocal movement. The foot supports may move in a generally vertical linear motion which is converted to rotary motion of the disk 118.

As a user shifts their weight on the reciprocating members of the exercise machine, reciprocal movement of the exercise machine foot support members rotates the ring gear 104. The ring gear 104 rotates the compound planet gears 107 which in turn rotates the sun gear 110 and disk 118 at a higher speed than the ring gear 104. The configuration of the magnetic brake assembly 100 incorporating planet gears having different diameters yields a higher gear ratio and consequently higher speed of the disk 118 than standard single stage planetary gear configurations known in the art.

For example, but not limited to, assuming that a cable spool and a rotary disk are directly connected, and each are three inches in diameter (each having a circumference of approximately 10 inches (pie times diameter)) and the linear movement of the exercise machine foot supports is 10 inches, each stroke of the foot supports equals approximately one revolution of the rotary disk. Assuming a stroke rate of 60 strokes per minute (i.e. 60 revolutions of the rotary disk per minute), that rate of disk rotation may not be sufficient to generate a reasonable magnetic braking force to provide significant resistance to the reciprocal movement of the exercise machine foot support members.

In an example implementation of the magnetic brake assembly 100, where the cable spool 101 is one inch in diameter (approximately 3 inches in circumference) directly connected to a rotary disk 118 three inches in diameter (approximately 10 inches in circumference), each ten inch stroke of the foot support members yields three revolutions per second of the rotary disk (i.e. about 180 revolutions of the rotary disk per minute).

However, three revolutions per second of the disk 118, particularly with magnets 134 of moderate size and price, may not be sufficient surface speed of the disk 118 to generate a reasonable magnetic braking force. For the magnetic cable assembly 100, the combination of a small diameter cable spool 101 and compound planetary gears 107 boost the surface speed of the disk 118 sufficiently to generate a reasonable magnetic braking force. As noted above herein, each of the compound planetary gears 107 includes small diameter planetary gears 106A, 106B and 106C connected inline to larger diameter planet gears 105A, 105B and 105C, respectively. The small and large diameter planetary gears therefore rotate together. Rotation of the cable spool 101 (1 inch diameter) at three revolution per second yields six revolutions per second of the compound gears 107 where the diameter of the small planetary gears 106A, 106B and 106C is 0.5 inches, which in turn rotates the sun gear 110 and disk 118 six revolutions per second, which yields 360 revolutions per minute of the disk 118 for an exercise rate of sixty strokes per minute of the exercise machine foot supports. Maximum eddy current resistance may be generated when the circumferential region of the disk 118 is fully between the magnets 134. The eddy current resistance decreases to zero when the magnets 134 are positioned past the circumferential edge of the disk 118.

While a preferred embodiment of the invention has been shown and described, other and further embodiments of the invention may be devised without departing from the basic scope thereof, and the scope thereof is determined by the claims which follow.

The invention claimed is:

1. A magnetic brake assembly for an exercise machine, comprising:

a) a mounting bracket secured to the exercise machine;
b) a cable spool rotatably secured to the mounting bracket;
c) a cable wrapped over said cable spool, said cable connected to movable members of the exercise machine;
d) a planetary gear set operably supported by said mounting bracket, said planetary gear set including at least:
  (i) a ring gear;
  (ii) one or more planet gears;
  (iii) a sun gear;
e) a brake disk secured to said sun gear;
f) a magnet holder carrying a pair of magnets in spaced apart relationship to one another, a gap defined between said pair of magnets;
g) said magnet holder movable to position a circumferential portion of said disk in said gap between said pair of magnets.

2. The magnetic brake assembly of claim 1 wherein said one or more planet gears comprise a compound gear of rigidly connected inline first and second planet gears having different diameters.

3. The magnetic brake assembly of claim 2 wherein said ring gear is coupled to said cable spool, said first planet gear meshing with said ring gear and said second planet gear meshing with said sun gear.

4. The magnetic brake assembly of claim 3 wherein said diameter of said second planet gear is greater than said diameter of said first planet gear.

5. The magnetic brake assembly of claim 2 wherein said ring gear is integrally formed with said cable spool.

6. The magnetic brake assembly of claim 1 wherein said sun gear includes an axially extending shaft, and further including a fan mounting plate fixedly secured proximate to a distal end of said shaft, said fan mounting plate extending transverse to the longitudinal axis of said shaft.

7. The magnetic brake assembly of claim 6 wherein said fan mounting plate includes a hub defining an axial opening through the mounting plate, and further including a plurality of fan blades extending radially outward from said hub of said fan mounting plate.

8. The magnetic brake assembly of claim 1 wherein said magnet holder is slidably coupled to a magnet support bracket applying a downward biasing force to said magnet holder.

9. The magnetic brake assembly of claim 1 further including an actuator for variably adjusting the position of said pair of magnets relative of said disk.

10. The magnetic brake assembly of claim 1 further including a planet gear carrier rotatably supporting said planetary gear set.

* * * * *